United States Patent [19]

Chow et al.

[11] Patent Number: 5,254,076
[45] Date of Patent: Oct. 19, 1993

[54] CENTRIFUGAL PYROCONTACTOR

[75] Inventors: Lorac S. Chow, Willowbrook; Ralph A. Leonard, River Forest, both of Ill.

[73] Assignee: ARCH Development Corporation, Chicago, Ill.

[21] Appl. No.: 927,028

[22] Filed: Aug. 6, 1992

[51] Int. Cl.⁵ .......................... B04B 7/12; B04B 11/00
[52] U.S. Cl. ........................ 494/37; 210/787; 366/305; 366/306; 366/307; 422/258; 422/259; 494/63; 494/65; 494/79; 494/81
[58] Field of Search ............... 494/12, 43, 50, 51, 494/56, 60, 62, 63, 65, 66, 74, 79, 80, 85, 22, 81, 37; 366/134, 168, 171, 172, 173, 174, 194, 195, 305–307, 348; 210/360.1, 380.1, 381, 378, 383, 781, 787, 360.2; 422/258, 259, 159

[56] References Cited

U.S. PATENT DOCUMENTS

| | | | |
|---|---|---|---|
| 3,471,131 | 10/1969 | Fritzweiler et al. | 366/307 X |
| 3,662,892 | 5/1972 | Sorensen . | |
| 3,674,196 | 7/1972 | Gutter | 494/22 X |
| 3,756,505 | 9/1973 | Miachon | 494/22 |
| 3,784,009 | 1/1974 | Maciula . | |
| 3,935,103 | 1/1976 | Disque et al. . | |
| 4,267,043 | 5/1981 | Benson . | |
| 4,483,624 | 11/1984 | Bacon, Jr. et al. | 366/307 X |
| 4,786,480 | 11/1988 | Martin | 494/31 X |
| 4,814,046 | 3/1989 | Johnson et al. | 252/627 X |
| 4,853,336 | 8/1989 | Saros et al. . | |
| 4,925,441 | 5/1990 | Jubin | 494/32 |
| 4,959,158 | 9/1990 | Meikrantz | 494/37 X |
| 4,971,692 | 11/1990 | Sklokin et al. . | |
| 4,971,912 | 11/1990 | Buhl et al. . | |
| 4,994,186 | 2/1991 | Hays . | |
| 5,009,796 | 4/1991 | Petrik et al. . | |
| 5,024,647 | 6/1991 | Jubin et al. | 494/43 X |
| 5,073,266 | 12/1991 | Ball, IV . | |
| 5,091,088 | 2/1992 | Essop . | |
| 5,141,328 | 8/1992 | Dilley | 366/307 X |

OTHER PUBLICATIONS

"Recent Advances in Centrifugal Contactor Design," Ralph A. Leonard, *Separation Science and Technology*, 23 (12 & 13), pp. 1473–1487, 1988.

*Primary Examiner*—Chris K. Moore
*Assistant Examiner*—Charles Cooley
*Attorney, Agent, or Firm*—Reinhart, Boerner, Van Deuren, Norris & Rieselbach

[57] ABSTRACT

A method for mixing and separating immiscible liquid salts and liquid metals in a centrifugal contractor. The method includes introducing the liquids into an annular mixing zone and intensely mixing the liquids using vertical vanes attached to a rotor cooperating with vertical baffles, a horizontal baffle, and bottom vanes attached to the contactor housing. The liquids enter the contactor in the range of 700–800 degrees Celsius. The liquids are separated in the rotor into a dense phase and a light phase which are discharged from the contactor.

4 Claims, 3 Drawing Sheets

CENTRIFUGAL PYROCONTACTOR

CONTRACTUAL ORIGIN OF THE INVENTION

The United States Government has rights in this invention pursuant to Contract No. W-31-109-ENG-38 between the U.S. Department of Energy and The University of Chicago, representing Argonne National Laboratory.

BACKGROUND OF THE INVENTION

The present invention relates generally to a contactor for mixing and separating immiscible liquids. More particularly, the invention relates to an improved apparatus and method for mixing and separating liquid salts and metals at temperatures up to 800° C.

Centrifugal contactors are useful for chemical separation processes. Centrifugal contactors offer the following advantages over other types of extraction equipment:

1. Continuous countercurrent operation in a compact multistage unit.
2. A simple design that is easy to build, operate and maintain.
3. Compact size which allows fast startup and shutdown, which has greater nuclear criticality safety and permits operation in confined spaces.
4. A flexible design which allows for a wide range of phase ratios, feed and product stream locations and numbers of stages as dictated by the desired process.

A pyrocontactor is a high-temperature centrifugal contactor which is capable of mixing and separating liquid salts and metals at temperatures up to 800° C. A pyrocontactor provides a mixing region for mixing and extracting two immiscible liquids and a centrifugal separating zone for separating the liquid-liquid dispersion into two phases. These contactors can be used in a wide variety of applications which include (1) separating transuranic (TRU) elements from the waste salt generated from the fuel cycle of a fast reactor that recycles and burns all TRU elements and (2) purifying plutonium from intractable scraps and residues accumulated at the Department of Energy production sites. Pyrocontactors also can be used for separating metallic elements in a wide variety of applications.

Efficient and effective mixing in a pyrocontactor is critical to obtaining satisfactory end results. While on inventor has alluded to the importance of mixing in typical centrifugal contactors (please see U.S. Pat. No. 5,024,647), no prior art structure which is designed to maximize the amounts of mixing energy imparted per unit volume of liquid in a centrifugal contactor is known to the inventors.

It is therefore an object of the invention to provide an improved apparatus and method for mixing and separating liquids.

It is a further object of the invention to provide an improved centrifugal contactor for mixing and separating immiscible liquids.

It is yet another object of the invention to provide an improved centrifugal pyrocontactor which provides more effective mixing than prior art devices.

A still further object of the invention is to provide an improved method and apparatus for mixing and separating liquid salts and metals at high temperatures.

Further objects and advantages of the present invention, together with the organization and manner of operation thereof, will become apparent from the following detailed description of the invention when taken in conjunction with the accompanying drawings.

DETAILED DESCRIPTION OF THE PREFERRED EMBODIMENT

Figure 1:
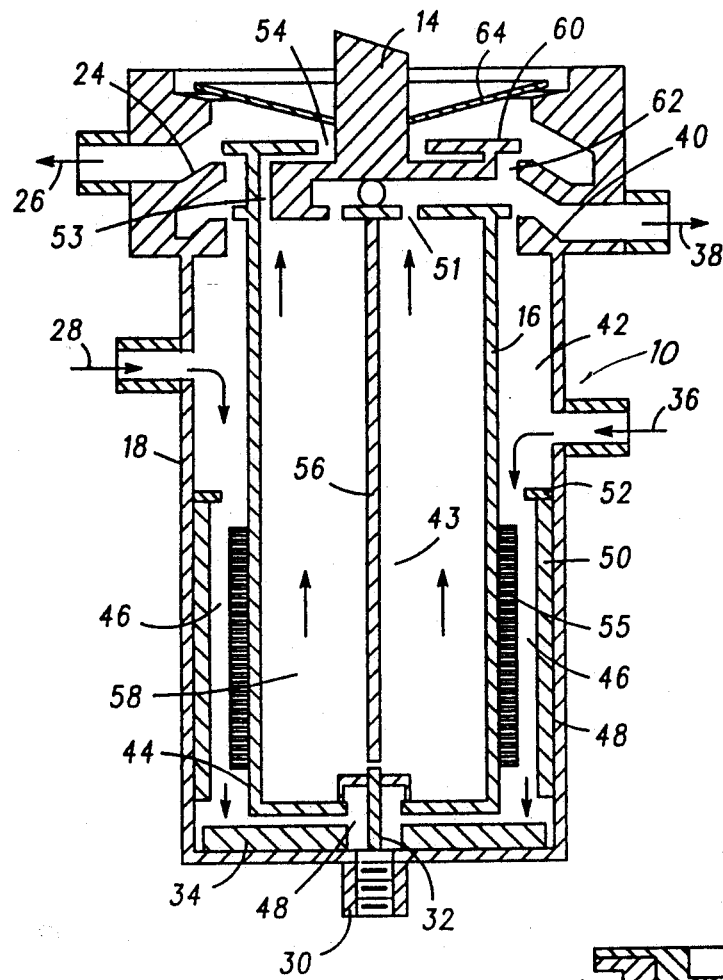
FIG. 1 illustrates a sectional view of a pyrocontactor constructed in accordance with the invention.

Referring now to the figures and more particularly to FIG. 1, a pyrocontactor constructed in accordance with the invention is indicated generally at 10. The pyrocontactor 10 includes a motor 12, a drive shaft 14, a rotor 16 and an outer housing 18. Preferably, the rotor 16 and the outer housing 18 comprise type 304 stainless steel to withstand corrosion of molten metal and salts while operating at 500 degrees Centigrade.

Figure 2:
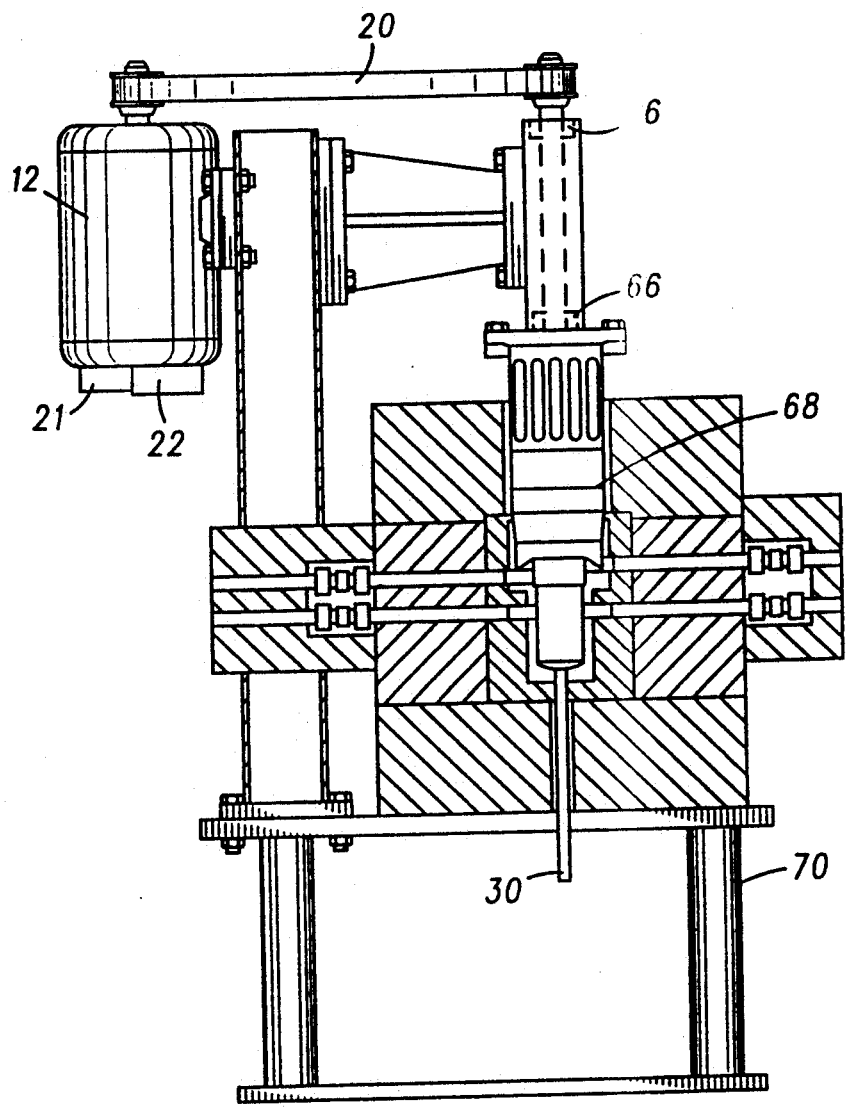
FIG. 2 shows a sectional view of a pyrocontactor and its associated drive and support structure.
Figure 6:
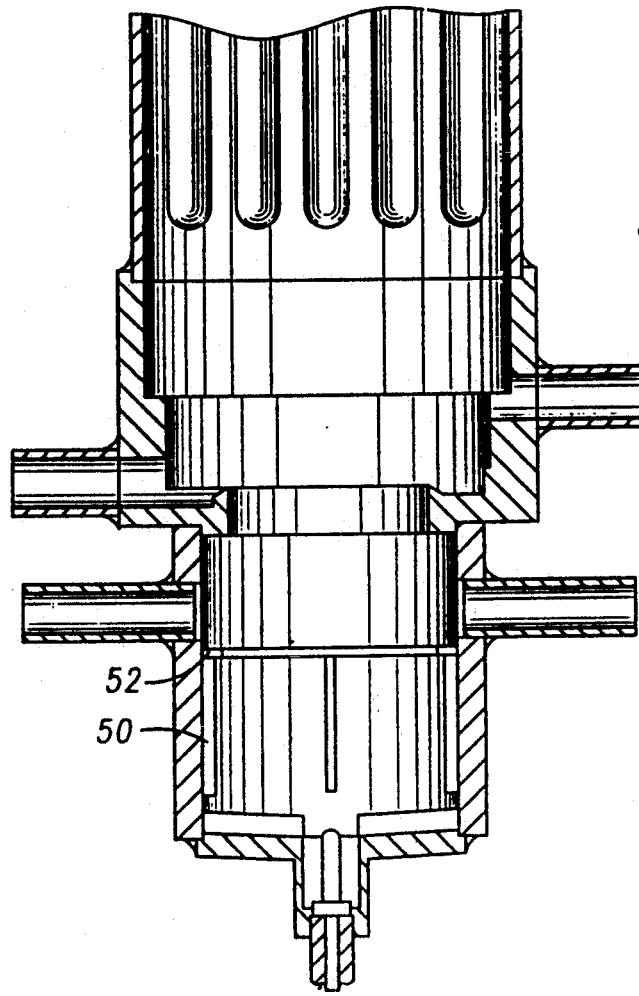
FIG. 6 shows a sectional view of the stationary housing of a pyrocontactor.
Figure 5:
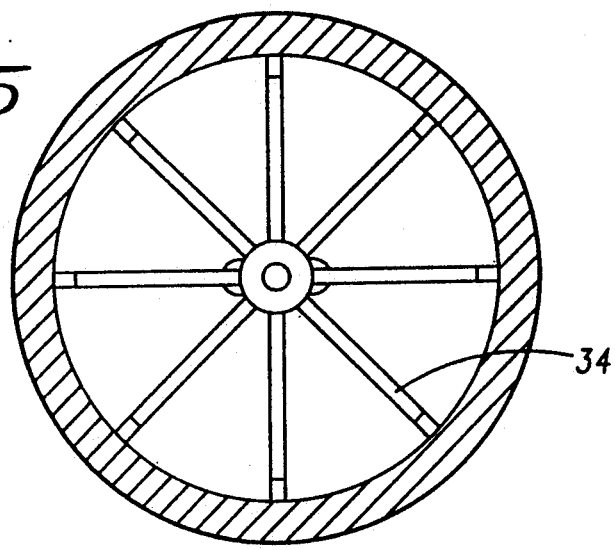
FIG. 5 illustrates a sectional view of the stationary housing of a pyrocontactor below the rotor.

The pyrocontactor drive shaft 14 is belt 20 driven by a variable speed, one-quarter horsepower, direct current motor 12. This arrangement protects the motor 12 from being overheated from the high pyrocontactor 10 operating temperature. As shown in FIG. 2, the motor 12 is used in conjunction with a speed controller 21 and a tachometer 22 to adjust and monitor the rotor 16 speed. The typical rotor 16 operating speed is 2500 revolutions per minute.

Figure 3:
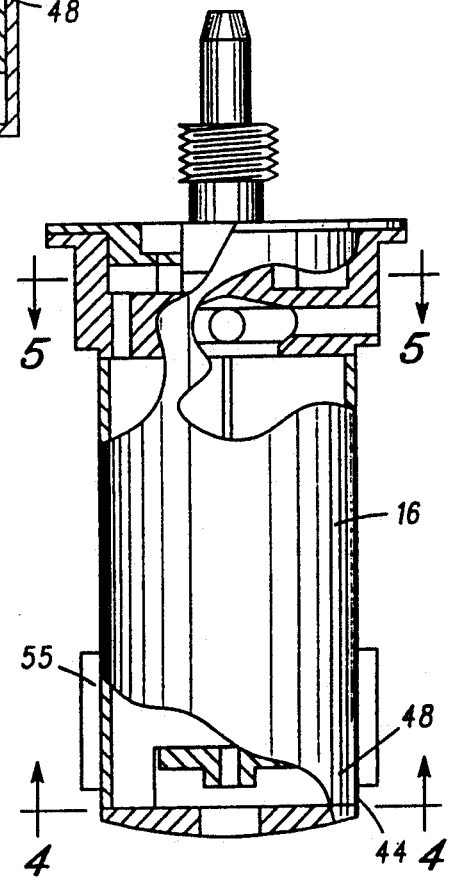
FIG. 3 illustrates a side view of a pyrocontactor rotor constructed in accordance with the invention.

The bottom of the rotor 16 should be tapered approximately 10 degrees from horizontal, as shown in FIG. 3, so that there are two phases remaining in contact with the spinning rotor 16 even at low liquid flow rates. Because the rotor 16 is integrally connected to the drive shaft 14, the rotor 16 is thereby rotatably connected with the motor 12. It will be obvious to one skilled in the art that a variety of common driving mechanisms can be used interchangeably with the driving structure described.

As shown in FIGURE 1, the outer housing 18 includes an upper collector 24, a dense phase exit 26, a dense phase inlet 28, a drain 30, a spindle bearing 32, bottom vanes 34, a light phase inlet 36, a light phase exit 38 and a lower collector 40. The rotor 16 is mounted in the interior 42 of the outer housing 18, and is integral with the drive shaft 14, which is connected to the motor 12 for rotation therewith.

A portion of the interior 42 of the outer housing 18 and a portion of the exterior 44 of the rotor 16 define an annular mixing zone 46. The mixing zone portion 48 of the interior 42 of the outer housing 18 includes vertical baffles 50 and a horizontal baffle 52 to reduce liquid splashing during mixing.

Figure 4:
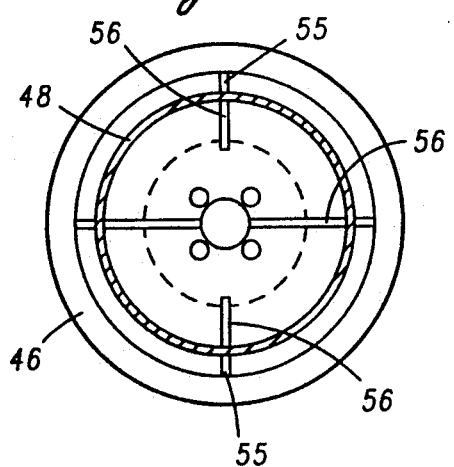
FIG. 4 shows a sectional view of a pyrocontactor rotor along line A—A in FIG. 3.

As shown in FIGS. 1, 3 and 4 the mixing zone portion 48 of the rotor 16 includes four vertical vanes 55 disposed radially about the exterior 44 of the rotor 16 to enhance mixing in the annular mixing zone 46. The vanes 55 are preferably sized to define a mixing zone 46 of at least one-sixteenth inch minimum clearance between the vanes 55 and the vertical baffles 50. The vanes 55 impart tremendous mixing energy per unit volume of liquid to the mixture, thus improving both the intensity of the mixing and the mixture consistency.

Immiscible liquids enter the dense phase inlet 28 and the light phase inlet 36 and flow to the annular mixing zone 46. As the rotor 16 rotates under power from the motor 12, efficient mixing of the liquids (including those with high interfacial tension) is accomplished. The liquid-liquid dispersion created by the turbulent flow in the annular mixing zone 46 flows by gravity to the rotor inlet 48. Eight bottom vanes 34 minimize vortex formation and allow the liquid-liquid dispersion from the mixing zone 46 to enter the rotor inlet 48 radially.

In addition to the rotor inlet 48, the rotor 16 includes a lower weir 51, an underflow 53, an upper weir 54 and four internal blades 56. The interior 43 of the rotor 16 comprises a centrifugal separating zone 58. As the dispersion enters the rotor 16, it contacts the internal vertical blades 56 which rotate at high angular velocity with the rotor 16 and the motor 12. This contact rapidly accelerates the dispersion to rotor 16 velocity. The resultant high centrifugal forces rapidly break the dispersion. The resultant phases which have been separated in the centrifugal separating zone 58 flow generally upward. The dense phase exits 2 the outer housing 18 after it is spun from the rotor 16 via the underflow 52 and flows over the upper weir 54. Upon flowing over the upper weir 54, the liquid encounters the slinger ring 60 which throws the dense phase liquid radially outward where it is caught by the upper collector ring 24. The slinger ring 60 is used at the top surface of the rotor 16 to cover the gap 62 between the rotor 16 and the upper collector ring 24 for the dense phase liquid. This minimizes the flow of the dense phase liquid down into the lower collector ring 40 for the light phase liquid. From the upper collector ring 24, the dense phase liquid exits the pyrocontactor 10 through the dense phase exit 26. A splash plate 64 is installed above the rotor 16 to minimize upward movement of fine liquid droplets and of vapor. For rotor 16 removal, the slinger ring 60 and the splash plate 64 may be able to move up freely through the housing that holds the bearings 66 for the rotor 26 shaft.

The light phase liquid flows generally upward and exits over the lower weir 50. Centrifugal force throws the liquid radially outward where it is caught by the lower collector 40. From the lower collector 40, the light phase liquid exits the pyrocontactor 10 via the liquid phase exit 38. Both the light phase exit 38 and the dense phase exit 26 are preferably sized to allow smooth flow between contactor stages without significant liquid buildup in the interstage lines during multistage operation. The diameters of the upper weir 54 and the lower weir 50 are preferably chosen to appropriately balance the light phase and dense phase liquid flow from the separating zone. As a nonlimiting example, for a liquid cadmium and liquid chloride salt system using a 4 cm contactor, the diameter of the lower weir 50 should be 0.625 inch and the upper weir 54 diameter should be 0.875 inch.

The rotor 16 should have sufficient length to obtain the desired degree of separation at the maximum flow rate. For the above-referenced cadmium and chloride salts example, approximately 2.875 inches is a satisfactory length.

The drive shaft 14 should be sufficiently stiff so that the rotor 16 will operate at least 20% below the shaft's 14 first critical speed. Calculations have shown that for a 4 cm rotor 16 with a drive shaft 14 diameter of 1.25 inches and a drive shaft 14 length of 8.5 inches between the lower bearing 66 and the top of the rotor 16, the first critical speed (which is also known as the first natural frequency) is 5800±1200 revolutions per minute. This critical speed is well above the pyrocontactor operating speed of 1000 to 2500 revolutions per minute.

The bearing 66 supporting the rotor 16 shaft must be located far enough away from the rotor 16 to avoid thermal damage. As shown in FIG. 2, heat shields 68 are used between the rotor 16 and the bearings 66 to reduce the length of the drive shaft 14 required. It should be noted that a longer drive shaft 14 will have a lower critical speed that may come within 20% of the operating speed.

A spindle bearing 32 is installed at the bottom of the outer housing 18 for stabilizing the spinning rotor 16 to reduce and prevent rotor 16 vibration during operation. While experimental calculation has shown that the drive shaft 14 is sufficiently stiff to allow operation without the spindle bearing 32, in the preferred embodiment, the spindle bearing 32 has been retained to eliminate potential vibration problems.

A drain 30 at the bottom of the outer housing 18 is provided for draining and cleaning the pyrocontactor 10 after operation to reduce corrosion of the pyrocontactor. During normal operation of the pyrocontactor 10, the drain 30 is closed.

A support structure 70 for the pyrocontactor unit 10 is shown in FIG. 2. The pyrocontactor 10 operates at well below (at least 40% below) the first natural frequency of the structure 70.

While preferred embodiments have been illustrated and described, it should be understood that changes and modifications can be made therein without departing from the invention in its broader aspects. Various features of the invention are defined in the following claims.

What is claimed is:

1. A method for mixing and separating immiscible liquid salts and liquid metals at high temperatures in a centrifugal contactor having a rotor disposed for rotation about a vertical axis within an outer housing, comprising the steps of:

introducing the liquid salts and liquid metals into an annular mixing zone defined by an exterior substantially cylindrical surface of said rotor and an interior substantially cylindrical surface of said outer housing;

placing vertical vanes on said substantially cylindrical surface of said rotor, and locating said vertical vanes adjacent vertical baffles placed on said interior substantially cylindrical surface of said outer housing;

intensely mixing the immiscible liquid salts and liquid metals in said mixing zone between said vertical vanes attached to said exterior substantially cylindrical surface of said rotor and said vertical baffles by propelling said liquid salts and liquid metals along a horizontal baffle affixed to said interior substantially cylindrical surface of said outer housing and past said vertical baffles and said vertical vanes, such that only radial forces need be applied to said liquid salts and liquid metals to provide efficient mixing;

reducing splashing of the liquid salts and liquid metals during said mixing by contacting said liquid salts and metals with said horizontal baffle and said vertical baffles;

minimizing vortices in the immiscible liquid salts and liquid metals by allowing the mixed liquid salts and liquid metals to flow over bottom vanes attached to a bottom portion of said outer housing;

allowing the mixed liquid salts and liquid metals to enter an interior portion of said rotor radially after passing over said bottom vanes and passing through an inlet disposed in a bottom portion of said rotor;

separating the immiscible liquid salts and liquid metals into a dense phase and a light phase in said interior portion of said rotor; and providing separate exits from said interior portion of said rotor for said dense phase and said light phase of the immiscible liquid salts and liquid metals.

2. The method as defined in claim 1, wherein the immiscible liquid salts and liquid metals are generated by the fuel cycle of a nuclear reactor and said centrifugal contactor at temperatures in the range of 700–800 degrees Celsius.

3. The method as defined in claim 1, wherein said rotor and said outer housing comprise stainless steel to provide resistance to corrosion.

4. The method as defined in claim 1, further comprising the step of draining all remaining liquid salts and liquid metals from said centrifugal contactor to reduce corrosive contact therebetween.

* * * * *